June 30, 1964 J. C. FREEBORN 3,139,534

PULSE CHARACTERIZING APPARATUS USING SATURABLE CORE MEANS TO EFFECT PULSE DELAY AND SHAPING

Filed June 17, 1960

INVENTOR.
JOHN C. FREEBORN
BY Warren A. Sturm
ATTORNEY

United States Patent Office 3,139,534

Patented June 30, 1964

3,139,534

PULSE CHARACTERIZING APPARATUS USING SATURABLE CORE MEANS TO EFFECT PULSE DELAY AND SHAPING

John C. Freeborn, Minneapolis, Minn., assignor to Minneapolis-Honeywell Regulator Company, Minneapolis, Minn., a corporation of Delaware Filed June 17, 1960, Ser. No. 36,841

6 Claims. (Cl. 307—88.5)

This invention relates to electronic time delay apparatus, and more specifically to an electronic delay timer which is responsive to an applied electrical signal, for effecting a desired circuit controlling operation which persists for a predetermined time after the elapse of another predetermined time interval.

The primary object of the present invention is to provide a novel and improved time delay device which is made up entirely of solid state components, and is therefroe extremely rugged and insensitive to shock vibration.

Another principal object of the invention is to provide an electronic timing circuit which is extremely simple in its construction and which will be reliable in operation.

Still another object of the invention is to provide a timing circuit, as aforesaid, the delay periods of which are independently adjustable within certain limits.

Still another object of my invention is to provide a variable interval, timer simple and accurate in its adjustment.

Yet still another object of the present invention is to provide a novel time delay circuit which does not depend on a capacitor discharge arrangement to obtain the desired timing intervals.

To these and other ends, including such further objects and advantages as are hereinbelow apparent or are incidental to the disclosed apparatus, a presently preferred embodiment of the present invention is described below and shown in the accompanying drawings, by way of example, to illustrate the features and principles of improvement.

Referring to the drawings.

Figure 1:
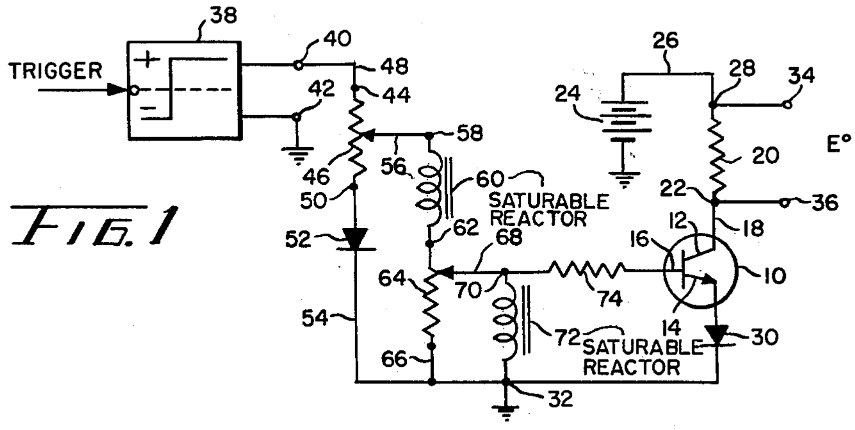
FIGURE 1 is a schematic diagram of the timing apparatus embodying my invention.

Referring now to FIGURE 1 there is shown switching means, here shown as a transistor 10, having a pair of output electrodes 12 and 14 and a control electrode 16. Transistor 10 is illustrated as being of the NPN type, but it should be understood that a PNP type transistor may also be used as the switching means if the proper polarity conventions are observed. The output electrode 12 (collector) of transistor 10 is connected by means of a conductor 18 to one side of a load or utilization device 20 at a junction 22. A source of energy, here shown as a battery 24, is connected by means of a conductor 26 to the other side of load 20 at junction 28.

The other output electrode 14 (the emitter) of transistor 10 is connected through a diode 30 to a junction 32 which is maintained at ground potential. It can be seen then, that when transistor 10 is rendered conductive, a current path is established such that a current may flow from the positive terminal of the battery 24, through conductor 26, through the load device 20, through the collector to emitter path of the transistor 10 and through the diode 30 to ground. This current, when flowing through the load, produces a voltage drop across the output terminals 34 and 36.

In order to control the conductivity of the transistor 10 so as to effect an output across the terminals 34 and 36 of a predetermined time duration subsequent to the elapse of another predetermined time duration, there is provided a network including current limiting means, control circuit energizing means, and saturable reactor time delay means. More specifically, the control electrode 16 of transistor 10 is ultimately supplied from source 38 with the proper bias potential to render transistor 10 conductive. Control potential source 38 is provided with a first output terminal 40 and a second output terminal 42, the latter of which is preferably maintained at ground potential. Terminal 40 is normally maintained at some predetermined potential which is negative with respect to ground. When supplied with a trigger pulse, however, source 38 is effective to produce a potential at its output terminal 40 which shifts from this negative potential to a substantial positive potential. In accordance with the foregoing, source 38 may be a conventional bistable flip-flop circuit. Alternatively, if it is desired to produce the timing cycle by manually throwing a switch, source 38 may take the form of a battery having a grounded center tap and a switch which is movable between the negative and positive terminals of said battery.

As shown in FIGURE 1, the output terminal 40 of the control potential source 38 is connected to a first terminal 44 of a potentiometer 46 by means of conductor 48. The other terminal 50 of potentiometer 46 is connected through a diode 52 and a conductor 54 to the grounded junction 32. Diode 52 is poled so as to prevent the flow of current through the potentiometer 46 when terminal 40 is at a negative potential with respect to ground which thereby decreases the current drain from source 38. The wiper arm 56 of potentiometer 46 is connected directly to a first terminal 58 of a saturable reactor time delay means 60 the other terminal 62 of which is connected through a second potentiometer 64 and conductors 66 and 54 to the grounded junction 32. It can be seen then that by varying the position of the wiper arm 56 of potentiometer 46 it is possible to vary or control the amount of voltage applied to the winding as well as the current flowing through the winding on the saturable reactor 60 after saturation is reached.

The wiper arm 68 of potentiometer 64 is connected at junction 70 to one side of a second saturable reactor time delay means 72. The other side of the winding of reactor 72 is also connected to the grounded junction 32. Finally, the junction 70 is connected through a current limiting resistor 74 to the control electrode 16 of transistor 10. As before, by varying the position of the wiper arm 68 on potentiometer 64 it is possible to control the potential appearing at the junction 70 and also the current flowing through the winding of the saturable reactor time delay means 72 after saturation has occurred.

Now that the circuit layout and connections have been described in detail a description of the circuit operation will now be given.

*Operation*

When the voltage at terminal 40 is negative with respect to ground, a current flows from the grounded junction 32 through the winding of a saturable reactor 72, through the wiper arm 68, the portion of the potentiometer 64 between wiper arm 68 and junction 62, through the winding of saturable reactor 60, through the wiper arm 56 and the portion of the potentiometer 46 lying between the wiper arm 56 and terminal 44 to the terminal 40 of source 38. In addition, current also flows from the grounded junction 32 through conductor 66, through potentiometer 64, through the winding on saturable reactor 60, through the wiper arm 56 and the conductor 48 to terminal 40. These currents, when flowing through the saturable reactors 60 and 72, are sufficient to maintain the cores of these reactors in a state which may arbitrarily be defined as negative saturation. The core material used in saturable reactors 60 and 72 is preferably of the type exhibiting square or rectangular hysteresis loop characteristics. Many core materials are available which exhibit this property and, by way of example, one such material is orthonal which has a composition of 50% nickel and 50% iron. When the reactors 62 and 70 are in a saturated condition their impedance is quite low. However, there exists a sufficient drop across the impedance of reactor 72 to maintain the control electrodes 16 of transistor 10 negative with respect to the emitter electrode 14 thereof. Since transistor 10 is of the NPN type this negative bias on its base electrode is effective to maintain said transistor in a non-conducting state. The diode 30, which is connected directly between the emitter electrode 14 and the grounded junction 32, provides a voltage pedestal in the transistor emitter circuit such that the collector junction leakage current, which exists when the transistor is nonconducting, is prevented from flowing in the emitter circuit and is directed to flow from the collector junction into the base circuit and through the current limiting resistor 74 and the winding of reactor 72 to ground. If the emitter electrode 14 were connected directly to ground rather than through the diode 30 to ground, the leakage current would tend to flow from the collector 12 to the emitter 14 and would no longer be limited to the fundamental leakage current but would be amplified by a factor of $$\frac{1}{1-\alpha}$$

This leakage current would result in a substantial and undesirable drain on the source 24.

When the control source 38 is triggered, such that the potential appearing at its output terminal 40 changes from a negative value to a substantial positive value, the current flowing through the reactors 60 and 72 reverses in direction. The winding on saturable reactor 60 is designed to have an appreciably greater number of turns than does the winding of saturable reactor 72. As a result, the amount of current flowing from the source terminal 40, through conductor 48, through the portion of the potentiometer lying between the terminal 44 and the wiper arm 56, through the wiper arm 56 and through the winding of saturable reactor 60 to ground is sufficient to bring the core of reactor 60 out of negative saturation, whereas the current which flows through the winding of saturable reactor 72 to ground is insufficient to bring the core of reactor 72 out of negative saturation.

As is well known in the art, when cores of this type are being switched from one state of remanence to their opposite states, the reactor acts as a relatively high impedance whereas when saturation is reached the impedance drops off abruptly to a relatively low value. Since the reactor 60 is undergoing a change of state whereas reactor 72 remains in its state of saturation, the voltage appearing at the junction 70 remains substantially constant until the core of reactor 60 reaches positive saturation. As a result the transistor 10 is maintained in its nonconducting state. However, after a time period dependent on the number of turns, the amount of flux at saturation, and the voltage applied thereto, core 60 does reach saturation. When the core of reactor 60 saturates it presents a low impedance and therefore causes a material increase in the amount of current flowing from the positive source terminal 40, through the wiper arm 56, through the winding of reactor 60, through the wiper arm 68 and through the winding of saturable reactor 72 to the grounded junction 32. This increased current flowing through the saturable reactor 72 is effective to bring it out of its condition of negative saturation.

As the core of saturable reactor 72 begins to switch toward positive saturation, it becomes a high impedance such that junction 70 begins to rise in potential. When the potential at the control electrode 16 of transistor 10 becomes more positive than the potential at its emitter electrode 14, base current begins to flow and transistor 10 is rendered conductive. With transistor 10 conducting, a substantial current flows from the source 24 through conductor 26, and through the load device 20 from the collector to the emitter of transistor 10 to ground. The current flowing through the load device 20 causes an output to appear between the terminals 34 and 36. When the core of reactor 72 reaches positive saturation its impedance again drops to a relatively low value, thereby decreasing the potential on the control electrode 16 of transistor 10. Transistor 10 is therefore rendered nonconductive, again precluding the flow of current through the load.

Figure 2:
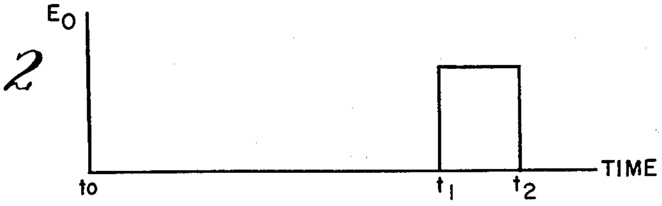
FIGURE 2 is a typical waveform produced in the circuit of FIGURE 1.

FIGURE 2 illustrates the waveform obtained between the terminals 34 and 36. At $T=0$ the trigger pulse is applied to the control potential source 38. During the time interval from $T=0$ to $T=T1$, saturable reactor time delay device 60 is undergoing a change in state and no output occurs. At $T=T1$, the core of reactor 60 has reached saturation and therefore the core of the saturable reactor 72 now begins to reverse its state of magnetization. From $T=T1$ to $T=T2$ the core of reactor 72 is switching such that transistor 10 is rendered conductive. At $T=T2$ the core of reactor 72 reaches saturation in the positive direction and, as a result, transistor 10 is again rendered nonconductive.

Because the time it takes for the cores of reactors 60 and 72 to saturate is proportional to the voltage applied to their windings, the time intervals 0 to T1 and T1 to T2 are adjustable within certain limits by varying the position of the wiper arms 56 and 68 on potentiometers 46 and 64, respectively. By way of example only, since the choice of component values and voltages is not critical, the following values and components may be used to provide the desired time intervals.

| | |
|---|---|
| Voltage at 40 | 10 volts. |
| Reactor 60 | 40,000 turns #30 wire. |
| Reactor 70 | 7,840 turns #30 wire. |
| R46 | 5,000 ohms. |
| R64 | 5,000 ohms. |
| Delay Time 1 | 2.50 seconds. |
| Delay Time 2 | 0.25 second. |

Figure 3:
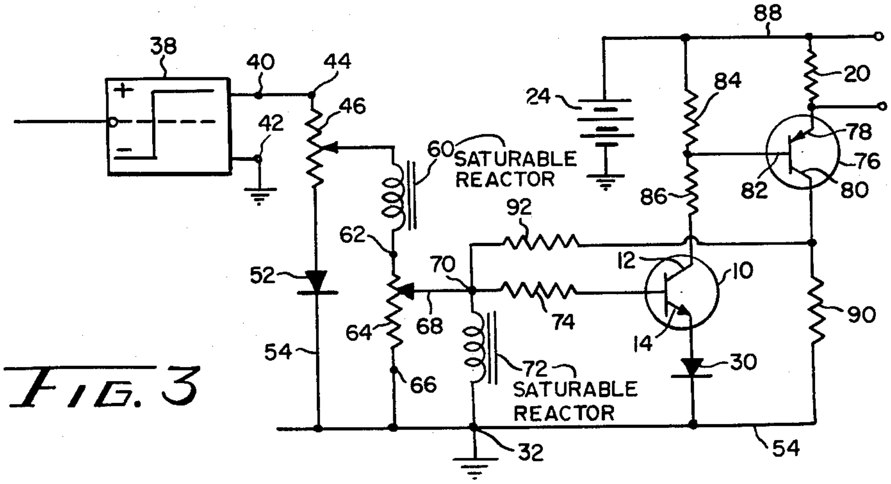
FIGURE 3 illustrates a second embodiment of my invention in which means are provided to shorten the rise and fall times of the output signal from the timer circuit.

*Modification of FIGURE 3*

In some applications, it may be necessary to provide an output pulse having a shorter rise time than can be obtained with the circuit shown in FIGURE 1. For example, with the resistance values and voltages shown above used in the circuit of FIGURE 1, the output pulse was observed to have a rise time of approximately 22 milliseconds. Although in most applications this may not be a serious drawback, the circuit of FIGURE 1 may be modified as shown in FIGURE 3, in order to materially decrease the rise and fall times of the output pulse. To the basic circuit of FIGURE 1 there has been added an additional transistor 76 having a pair of output electrodes 78 and 80 and a control electrode 82. The control or base electrode 82 is connected through a resistor 84 to the positive terminal of the energy source 24, and through a resistor 86 to the collector electrode 12 of transistor 10. The load or utilization device 20 is also connected to the positive terminal of the energy source 24 by means of a conductor 88, the other side of said load being connected to the output electrode 78. The other output electrode 80 of transistor 76 is connected through a resistor 90 and the conductor 54 to the grounded terminal 32. Also connected between the output electrode 80 of transistor 76 and the junction 70 is a feedback resistor 92.

When transistor 10 is in its nonconducting state, the base electrode 82 of transistor 76 is maintained at a potential which is approximately equal to the potential appearing at the emitter electrode 78 thereof. As a result, when transistor 10 is nonconducting, transistor 76 is also nonconducting. Subsequent to the application of the trigger pulse to the source of control potential 38, saturable reactor delay means 60 begins to saturate and therefore the potential at junction 70 begins to rise as has already been described. When the potential at junction 70 rises to a sufficiently high value so as to permit transistor 10 to conduct, a current flows from the positive terminal of the source 24 through the resistors 84 and 86 and through the transistor 10 and diode 30 to ground. This flow of current causes a drop in the potential across resistor 84 such that base current now flows from source 24, through conductor 88 and resistor 20, and through the emitter electrode 78 to the base electrode 82. Transistor 76 is therefore driven into conduction thereby allowing a relatively large current to flow from source 24 through the load 20, through the emitter to collector path of the transistor 76, and through the resistor 90 to the grounded terminal 32. The potential which now appears across the resistor 90 is applied through the feedback resistor 92 to junction 70 thereby causing the potential at this point to rise at a faster rate. As a result, transistor 10 is driven more rapidly to a state of full conduction. This, of course, also causes the transistor 76 to become conductive at a faster rate since the potential applied to its base electrode is a function of the amount of current flowing through transistor 10.

It has been found that by including its second transistor stage 76 and the feedback connection through resistor 92, a rise time of the output pulse can be reduced from 22 milliseconds to approximately 0.4 millisecond.

While I have shown and described my invention as embodied in certain details of construction, it should be understood that this is primarily for illustrating the principles of the now preferred embodiment of the invention and that the structural details may be modified or changed and the apparatus may be used in a variety of applications where predetermined timing is required, all within the spirit and scope of the invention.

What I claim is:

1. A circuit for producing an output pulse of a predetermined width after a predetermined time delay comprising: controlled switching means; utilization means; means connecting said utilization means to a source of energy through said switching means; first and second saturable reactor time delay means connected in controlling relation to said switching means and adapted to be energized by said energy source means; means including said first saturable reactor delay means for preventing conduction through said switching means for a first predetermined time interval during which the flux in said first reactor delay means is changing; and means including said second saturable reactor delay means for allowing conduction through said switching means for a second predetermined time interval during which the flux in said second saturable reactor delay means is changing after the termination of said first interval.

2. A circuit for producing an output pulse of a predetermined width after a predetermined time delay comprising: energy source means; switching means having a pair of output electrodes and a control electrode; utilization means; means connecting said pair of output electrodes in circuit with said source means and with said utilization means; first and second saturable reactor time delay means connected in circuit with said control electrode and said source means; said first delay means preventing conduction through said switching means for a first predetermined time interval and said second saturable reactor time delay means allowing conduction through said switching means for a second predetermined time interval beginning after the termination of said first interval.

3. A circuit for producing an output pulse of a predetermined width after a predetermined time delay comprising: energy source means; switching means having a pair of output electrodes and a control electrode; utilization means; means connecting said pair of output electrodes in circuit with said source means and with said utilization means; first time delay means including a core of magnetic material having a substantially rectangular hysteresis loop and winding means having first and second terminals; means connecting said first terminal to said energy source means; means connecting said second terminal to said control electrode; second time delay means comprising a core of magnetic material having a substantially rectangular hysteresis loop and winding means having first and second terminals; means connecting said first terminal of said winding means on said second time delay means to said control electrode; and means connecting said second terminal of said winding means on said second time delay means to a point of fixed potential, such that said first delay means prevents conduction through said switching means for a first predetermined time interval and said second delay means allows conduction through said switching means for a second predetermined interval after the termination of said first interval.

4. A circuit for producing an output pulse of a predetermined width after a predetermined time delay comprising: energy source means; semiconductor switching means having a pair of output electrodes and a control electrode; load means; means connecting said output electrodes in series between said source means and said load means; first time delay means including a magnetic core having a substantially rectangular hysteresis loop and winding means having first and second terminals; means including first variable resistance means connecting said first terminal to said energy source means, means including second variable resistance means connecting said second terminal to said control electrode; second time delay means including a magnetic core having a substantially rectangular hysteresis loop and winding means having first and second terminals; means connecting said first terminal of said winding means on said second time delay means to said control electrode; and means connecting said second terminal of said winding means on said second time delay means to said energy source means.

5. A circuit for producing an output pulse of a predetermined width a predetermined time after a change has occurred in the input comprising: semiconductor switching means having a pair of output electrodes and a control electrode; load means, energy source means; means connecting a first of said pair of output electrodes in circuit with said source means and said load means; means including unidirectional impedance means connecting a second of said pair of output electrodes to a point of fixed potential; a source of control potential operable to provide an abrupt change in voltage; means including a first adjustable resistance and a diode connected in series between said source of control potential and said point of fixed potential; first saturable core time delay means; second adjustable resistance means; means connecting said first saturable core time delay means and said second adjustable resistance means in series between said first adjustable resistance means and said point of fixed potential; second saturable core time delay means connected between said second adjustable resistance means and said point of fixed potential; and means connecting said second adjustable resistance means to said control electrode on said semiconductor switching means, the arrangement being such that said semiconductor switching means is maintained nonconducting for a period determined by the saturation time of the core of said first time delay means after said source of control potential is operated and rendered conductive for a period determined by the saturation time of the core of said second time delay means.

6. A circuit for producing an output pulse of a predetermined width after a predetermined time delay comprising: energy source means; first and second saturable reactor time delay means; first and second semiconductor switching means each having a pair of output electrodes and a control electrode; load means; means connecting said first and second delay means in circuit with said control electrode on said first switching means and said source means; means connecting said control electrode of said second switching means in circuit with one of said output electrodes on said first switching means and with said source means; means connecting said load means in circuit with said source means and said pair of output electrodes on said second switching means; and feedback means connecting said control electrode on said first switching means to one of said pair of output electrodes on said second switching means, such that when said first switching means is rendered conductive after a first predetermined time delay, said second switching means is rendered conductive thereby providing a feedback current to said first switching means.

References Cited in the file of this patent

UNITED STATES PATENTS

| | | |
|---|---|---|
| 2,492,736 | Custin | Dec. 27, 1949 |
| 2,677,800 | Phillips | May 4, 1954 |
| 2,808,990 | Van Allen | Oct. 8, 1957 |
| 2,863,072 | Alexander | Dec. 2, 1958 |
| 2,956,175 | Bothwell | Oct. 11, 1960 |
| 2,976,431 | Richards | Mar. 21, 1961 |
| 2,997,631 | Moakler | Aug. 22, 1961 |
| 3,015,741 | Richards | Jan. 2, 1962 |
| 3,065,363 | Ribner | Nov. 2, 1962 |
| 3,082,331 | Peaslee | Mar. 19, 1963 |

FOREIGN PATENTS

| | | |
|---|---|---|
| 72,976 | Denmark | August 1951 |
| 1,207,341 | France | Feb. 16, 1960 |